May 22, 1956     W. M. DE HARDIT     2,746,492
CHAIN SAW ATTACHMENT FOR A TRACTOR
Filed Aug. 25, 1953     2 Sheets-Sheet 1
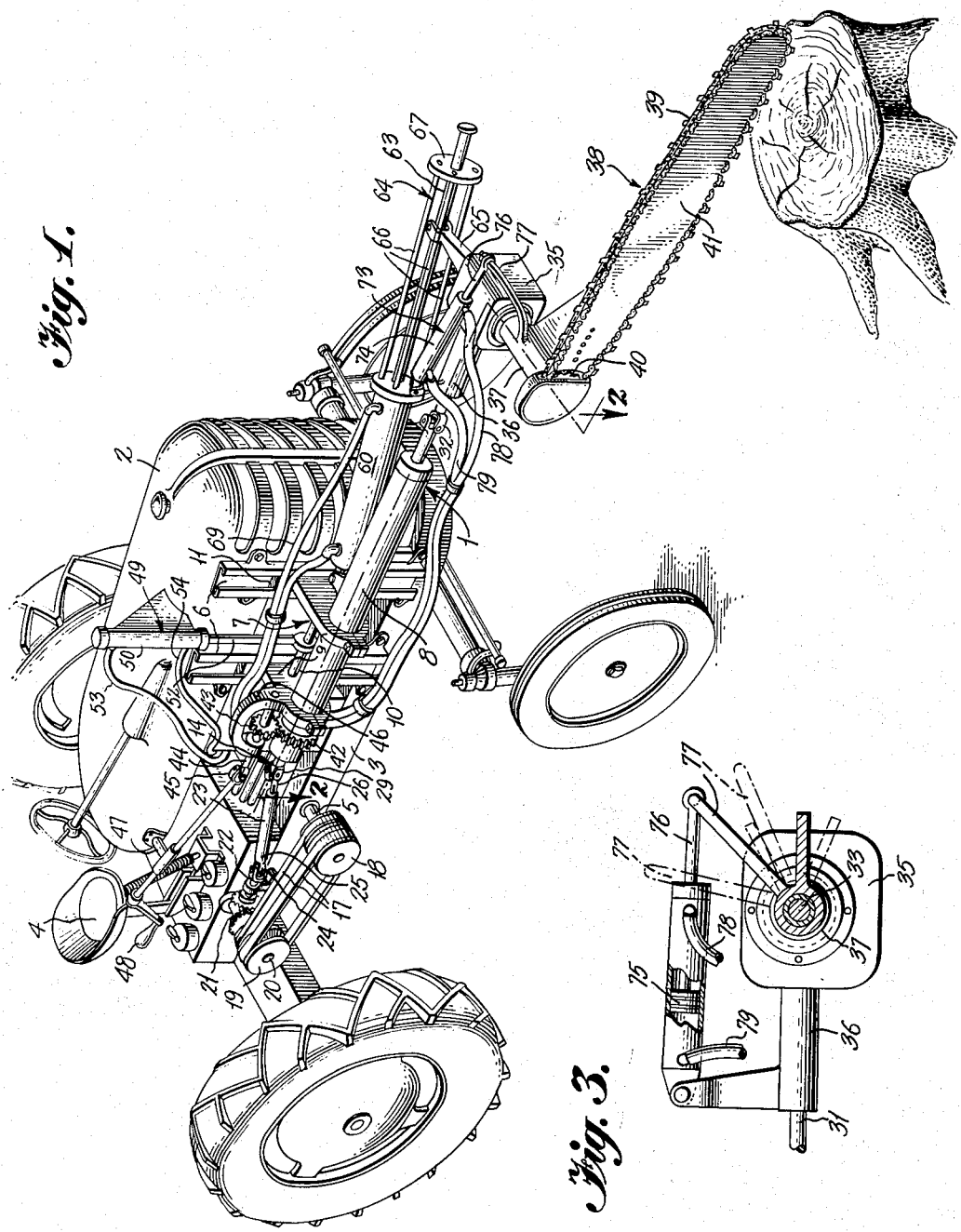
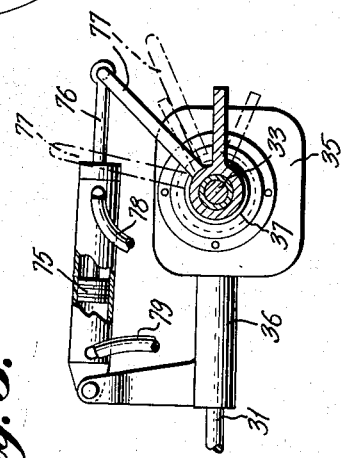
INVENTOR
William M. DeHardit
BY Mason, Fenwick & Lawrence
ATTORNEYS

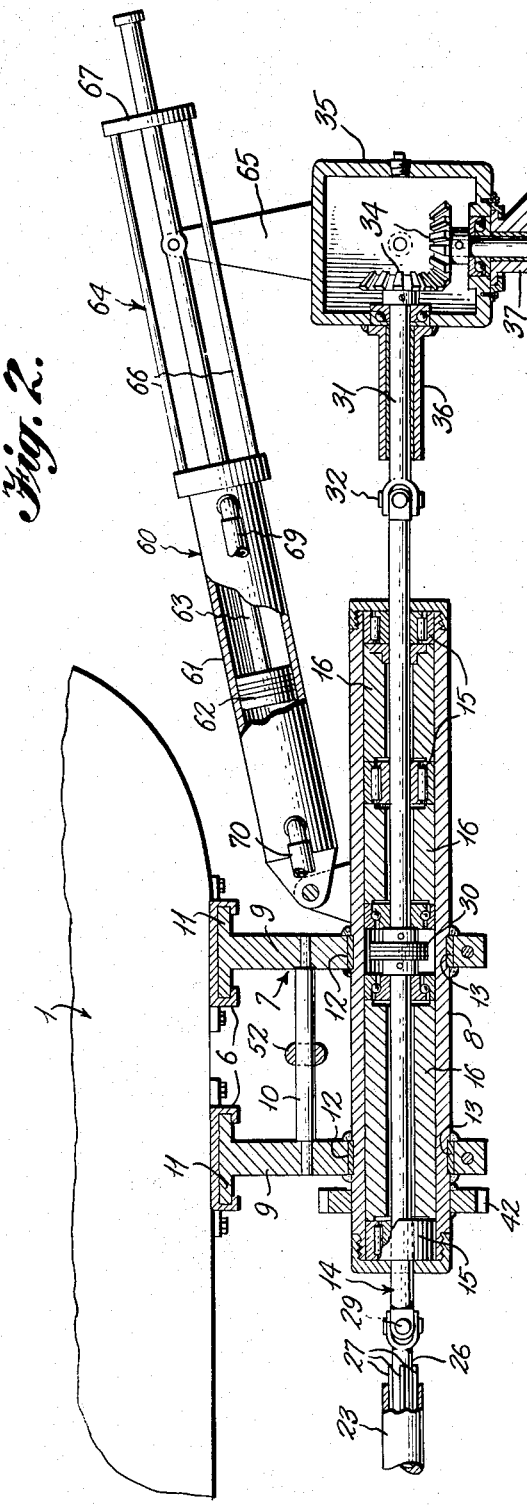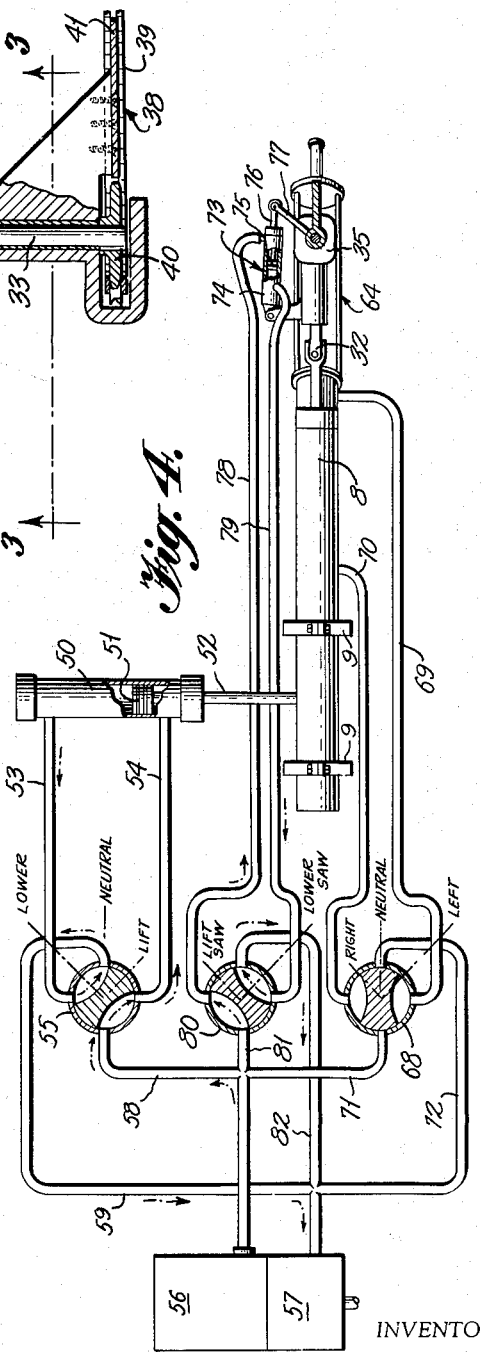

United States Patent Office 2,746,492
Patented May 22, 1956

2,746,492

CHAIN SAW ATTACHMENT FOR A TRACTOR

William M. De Hardit, Gloucester, Va.

Application August 25, 1953, Serial No. 376,391

3 Claims. (Cl. 143—32)

This invention relates to power driven saws, and particularly to tractor-mounted saws and saw units mountable on self-powered mobile devices.

While power saws are available for felling trees and cutting up the logs, there are many phases of land clearing which known types of saws are incapable of handling, or, if operable for the purpose, are unwieldly and dangerous to handle during these operations. After a tree is felled the log must be trimmed of branches before it can be cut. The stump must have the dirt removed, and then disposed of. Underbrush must be cleared away. To accomplish these things mechanically requires a device of extreme mobility and flexibility, and one which is quite rigid in all positions of adjustment.

The principal object of the present invention is to provide a tractor mounted saw, or saw unit for attachment to a tractor or other mobile power source, which is capable of attacking a tree, log, stump or underbrush from any angle, and which is completely under the control of an operator seated upon the mobile unit.

Another object of the invention is to provide such a device wherein the saw can be set and locked in any desired position, and the device is provided with safety controls to prevent breakage in the event the saw becomes jammed.

A further object is the provision of a device of this nature which is very simple, yet quite rugged in construction, and can be manufactured at low cost.

Other objects of the invention will become apparent from the following description of one practical embodiment thereof when taken in conjunction with the drawings which accompany, and form part of, this specification.

In the drawings:

Figure 1 is a perspective view of a power saw incorporating the principles of the present invention mounted upon a tractor;

Figure 2 is a horizontal section through the mounting and driving mechanism for the saw, and is taken on the line 2—2 of Figure 1;

Figure 3 is a vertical section through a portion of the saw drive showing some of the adjusting mechanism, and is taken on the line 3—3 of Figure 2; and Figure 4 is a diagrammatic view showing the hydraulic system for controlling the saw.

In general, the invention consists in a mobile saw unit, or a saw attachment for a mobile unit, in which the saw is adjustable as to height and through a wide angle in any plane from, and including, the horizontal to the vertical. In fact, the saw may be swung from a horizontal position above the drive shaft through 180° to a horizontal position below the drive shaft, and also to positions on opposie sides of the drive shaft. It can be stopped and held in any position between these extremes.

Referring to the drawings in detail, the saw unit 1 is shown as mounted upon a tractor 2. The tractor has the usual frame 3, operator's seat 4 and power take-off shaft 5.

The saw unit is carried by a pair of vertical guide tracks 6, which are bolted, or otherwise secured, to the tractor frame. These tracks are spaced apart longitudinally of the tractor frame a sufficient distance to provide a solid foundation for the saw unit. A sliding carriage 7 is mounted in the guide tracks and carries a cylindrical housing 8 which supports the saw mechanism. Carriage 7 is formed of two, spaced supports 9, joined by a tie-rod 10, and having shoes 11 slidably fitted within the guide tracks. Each support has an opening 12 near its outer end to receive a collar 13 which is fixed to the housing 8 and rotatable in the support opening.

Housing 8 is in the form of a cylinder of sufficient length to provide for adequate journalling of the saw drive shaft 14. Anti-friction bearings 15 are fitted within the housing at spaced points and receive the shaft 14. The bearings may be held in spaced relation by any convenient means, such as the sleeves 16.

Drive shaft 14 is in several sections, connected by universal joints, to permit the several adjustments of the saw which will be described later. The shaft is driven by means of belts 17 operating over a multiple sheave pulley 18, on the tractor take-off shaft 5, and a pulley 19 on a shaft 20. The belt drive is included as a safety factor, as the belts will slip in the event the saw binds or becomes jammed. Shaft 20 is journalled on the tractor frame and coupled to the driven end of shaft 14 by suitable gearing 21. The driven end section 22 of shaft 14 is connected to telescopic section 23 by means of a universal joint 24. Telescopic section 23 consists of the relatively slidable elements 25 and 26 which provide for elongation of the section 23 to allow adjustment of the housing 8, as will be described. The telescopic elements 25 and 26 will have means to prevent relative rotation such as the splines 27. Slidable member 26 is connected to the intermediate portion 28 of the drive shaft, which is within housing 8, by means of the universal joint 29. As a further precautionary measure, section 28 of the shaft may be divided and a friction clutch 30 interposed between the two members. The outer end of the intermediate portion of the shaft is coupled to the driving section 31 by the universal joint 32. This will provide universal movement and adjustment, of the driving end of the shaft. This portion of the shaft drives the saw shaft 33 through suitable gearing 34. The driving end 31 of shaft 14 and saw shaft 33 are journalled in a housing 35 which holds these shafts rigidly in position at 90° to one another, and also provides means by which the shafts may be suspended and adjusted with respect to other sections of the drive shaft. Housing 35 has tubular extensions 36 and 37 in which bearings for the shafts 31 and 33, respectively may be mounted. Saw 38, which may be either circular or a chain saw as illustrated, is fixed to the end of shaft 33.

The saw shown consists of a saw chain 39 which is driven by sprocket 40, fixed on shaft 33, and passes around the guide track 41. The guide track is supported by a brace or web extending from the housing 35.

The various adjustments of the saw are accomplished by means of manual means for rotating the saw from the vertical to horizontal, and hydraulic control means for changing the height of the saw above the ground and its angular position.

To rotate the saw to any angle within an arc of approximately 270°, the cylindrical housing 8 is provided with an encircling ring gear 42 near the rear end of the cylinder. Gear 42 is in mesh with a spur gear 43, fixed to the end of a control shaft 44. Shaft 44 is universally jointed, as at 45, and the end to which gear 43 is connected is journalled in an arm 46 which projects from one of the supports 9 of the carriage 7. Thus, the gears 42 and 43 will remain in mesh as the carriage is raised and lowered in the guide tracks 6. The other portion of shaft 44 is rotatably and slidably mounted in a bearing 47 which is swively attached to the tractor. By this arrangement, the carriage and cylindrical housing can be moved vertically and the housing rotated at any position of adjustment by means of the crank handle 48 on the end of control shaft 44.

Carriage 8 is caused to move vertically to adjust the saw height by means of a hydraulic piston and cylinder assembly 49. Cylinder 50 is attached to the tractor, and piston 51, in the cylinder, is connected to the tie-rod 10 of the carriage by the rod 52. Hose lines 53 and 54 connect opposite ends of the cylinder with a control valve 55, and the control valve is connected to a fluid tank 56 and pump 57 by lines 58 and 59 (see Figure 4). The control valve is conventional, and will be capable of movement to lift, lower and neutral, or locked positions.

The saw, when vertical, can be moved to various angular positions through a horizontal arc, or when horizontal through a vertical arc, by means of the hydraulic cylinder assembly 60. The assembly comprises cylinder 61, piston 62, piston rod 63, and bearing cage 64. Piston rod 63 is pivotally connected to the end of an arm 65 projecting from the side of housing 35, so that movement of the rod will cause the housing and saw to rock about the universal joint 32 as a pivot. The cylinder 61 is pivotally connected to the cylinder housing. This will move the saw laterally when in the position shown in Figure 1. Due to the fact that the driven end of shaft 14, housing 35, and the saw are freely movable about the joint 32, these parts will need support. Rather than impose this strain upon the unsupported end of piston rod 63, the bearing cage 64 has been provided. The cage is formed of a plurality of spokes 66 which are connected to the head of cylinder 61 and to a bearing member 67. Bearing 67 supports the outer end of piston rod 63, and, as the connection between the rod and arm 65 is intermediate the bearing points of the rod, there will be no great bending strain upon the rod. The cylinder is controlled by valve 68 which is connected by hose lines 69, 70 to opposite ends of the cylinder, and by hose lines 71, 72 to the fluid reservoir 56 and pump 57 respectively.

The saw is caused to move to swing in a vertical direction about the shaft 33 (when the saw is positioned vertically as viewed in Figure 1) by means of the cylinder assembly 73. This consists of cylinder 74, piston 75, piston rod 76 and arm 77 projecting from the gear housing extension 37. Cylinder 74 is pivotally connected to the gear housing extension 36. It will be noted from Figure 2 that the sleeve 37 extending from housing 35 is rotatably mounted in the housing, and that the saw guide is secured to this sleeve. Thus, when cylinder assembly 73 is actuated the saw will swing about the axis of shaft 33. This motion will allow the saw to be brought into contact with the stump or tree, and continue to move as the saw makes its cut. The piston is caused to move in the cylinder by fluid pressure which flows through hose lines 78 and 79 between the cylinder and the control valve 80, and hose lines 81 and 82 between the valve and the fluid reservoir and pump.

In operating the device, the tractor will run up to the tree to be felled, log to be sawed or stump to be cut up, as the case may be, and the saw adjusted to make the proper cut. The saw may be positioned vertically or horizontally or at any angle therebetween by rotating this cylindrical housing. The angle of attack may be set by operating the valve controlling the large cylinder assembly, and the saw brought into contact with the work by operating the valve controlling the small cylinder assembly. The device has complete universal movement, and it will be possible to cut in places which are normally hard to reach. The free movement of the saw will make it relatively easy to cut up stumps, or to cut away the roots, which has been a major problem in land clearing. As a great amount of earth usually clings to stumps and roots it will be necessary for the saw to be heavy and capable of cutting through earth and stone. However, the specific saw blade structure forms no part of this invention.

While in the above, one practical embodiment of this invention has been disclosed, it will be understood that the precise details shown and described are merely by way of illustration and that many changes may be made within the scope of the appended claims.

What is claimed is:

1. In a saw rig mountable upon a self-powered mobile unit having a power take-off, guide tracks mountable vertically in spaced relation upon one side of the mobile unit, a carriage mounted for vertical sliding movement on said guide tracks, means to move the carriage vertically, spaced outwardly extending brackets on said carriage, a horizontal housing rotatably mounted intermediate its ends in said brackets, manual means to rotate said housing, a plurality of spaced bearings in said housing, a power shaft mounted in said bearings and extending beyond the ends of said housing, means coupling one projecting end of said power shaft to the power take-off of the mobile unit, the opposite projecting end of said power shaft being articulated, a second housing journalling the articulated end of said power shaft, a saw shaft coupled to the articulated end of said power shaft and having one end journalled in said second housing and the saw shaft projecting from said second housing at right angles to said power shaft, a housing around said saw shaft, a chain saw guide connected to said saw shaft housing, a chain saw about said saw shaft and driven by said saw shaft, means carried by said horizontal housing and connected to said second housing to tilt said second housing, saw housing and chain saw in a plane including the axes of the power and saw shafts, and means carried by said second housing and connected to said saw shaft housing to tilt said saw shaft housing and chain saw about the axis of the saw shaft.

2. In a saw rig as claimed in claim 1, said means to couple said power shaft to the power shaft including articulated and telescopic shaft sections.

3. In a saw rig as claimed in claim 2, said means to couple said power shaft to said power take-off including a belt and pulley drive to permit slippage when said chain saw becomes jammed.

References Cited in the file of this patent
UNITED STATES PATENTS

| 2,075,954 | Osgood | Apr. 6, 1937 |
| 2,354,625 | Van Sickle | July 25, 1944 |
| 2,365,408 | Hillyer | Dec. 19, 1944 |
| 2,462,314 | Fuqua | Feb. 22, 1949 |
| 2,618,350 | Von Ruden | Nov. 18, 1952 |

FOREIGN PATENTS

| 118,817 | Australia | Aug. 14, 1944 |
| 122,748 | Australia | Nov. 7, 1946 |